US006774076B2

(12) United States Patent
Yu et al.

(10) Patent No.: US 6,774,076 B2
(45) Date of Patent: *Aug. 10, 2004

(54) CHROMIA SPRAY POWDERS AND A PROCESS FOR MAKING THE SAME

(75) Inventors: Sung H. Yu, Shrewsbury, MA (US); Howard Wallar, Rutland, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/234,422

(22) Filed: Sep. 3, 2002

(65) Prior Publication Data

US 2003/0191010 A1 Oct. 9, 2003

Related U.S. Application Data

(63) Continuation-in-part of application No. 10/118,133, filed on Apr. 8, 2002, now abandoned.

(51) Int. Cl.$^7$ .......................... C04B 35/10; C04B 35/105
(52) U.S. Cl. ..................................................... 501/132
(58) Field of Search ................................. 501/127, 132

(56) References Cited

U.S. PATENT DOCUMENTS

| | | | | |
|---|---|---|---|---|
| 3,954,641 | A | * | 5/1976 | Kawamata et al. |
| 4,906,426 | A | * | 3/1990 | Yamamoto .................. 264/12 |
| 4,976,948 | A | * | 12/1990 | Anand et al. ................ 423/607 |
| 5,011,798 | A | * | 4/1991 | Sasabe et al. ................. 501/87 |
| 5,139,978 | A | * | 8/1992 | Wood .......................... 501/127 |
| 5,219,806 | A | * | 6/1993 | Wood .......................... 501/127 |
| 5,811,071 | A | * | 9/1998 | Emblem et al. ............. 423/596 |
| 6,410,470 | B1 | * | 6/2002 | Wallar et al. ............... 501/126 |

FOREIGN PATENT DOCUMENTS

| | | | |
|---|---|---|---|
| JP | 60260426 | * | 12/1985 |
| JP | 04184903 | * | 7/1992 |
| JP | 05025606 | * | 2/1993 |
| KR | 2000040961 | * | 7/2000 |
| SU | 1819247 | * | 5/1993 |

OTHER PUBLICATIONS

"Studies of the air plasma spraying of chromium oxide powder" Varacalle et al. Advances in Thermal Spray Science and Technology, Proceedings of National Thermal Spray Coonference 8$^{th}$, Houston Sep. 11–15, 1995 365–372.*

Shibata, K., et al., "Fabrication and Mechanical Properties of $Cr_2O_3$ sold solution ceramics in the system $Cr_2O_3$ –$Al_2O_3$", Materials Research Bulletin, vol. 32, No. 5, pp. 627–632, 1997.

Watanabe, T., et al., "Formation of continuous series of solid solutions from powders prepared by hydrazine method: the system, $Cr_2O_3$ –$Al_2O_3$", Materials Research Bulletin, vol. 31, No. 7, pp. 861–868, 1996.

Sato, Koji, et al., "Preparation of Alumina–Chromia solid solution powder and thin film through precursor method", Ceramic Processing Science, vol. 83, pp. 451, 456–458, 1998.

Rossi, L., et al., "Elastic Properties of oxide solid solutions: the system, $Cr_2O_3$ $Al_2O_3$", Journal of the Amerian Ceramic Society, vol. 53, No. 11, pp. 604–608, 1970.

* cited by examiner

Primary Examiner—Paul Marcantoni
(74) Attorney, Agent, or Firm—Toler, Larson & Abel, LLP; Joseph P. Sullivan

(57) ABSTRACT

Particles particularly useful for thermal spraying a wear resistant coating on to a substrate comprise an essentially single phase crystalline structure comprising from 45 to 100% by weight of chromia and from 0 to 55% by weight of alpha alumina.

9 Claims, 1 Drawing Sheet

CHROMIA SPRAY POWDERS AND A PROCESS FOR MAKING THE SAME

Figure 1:
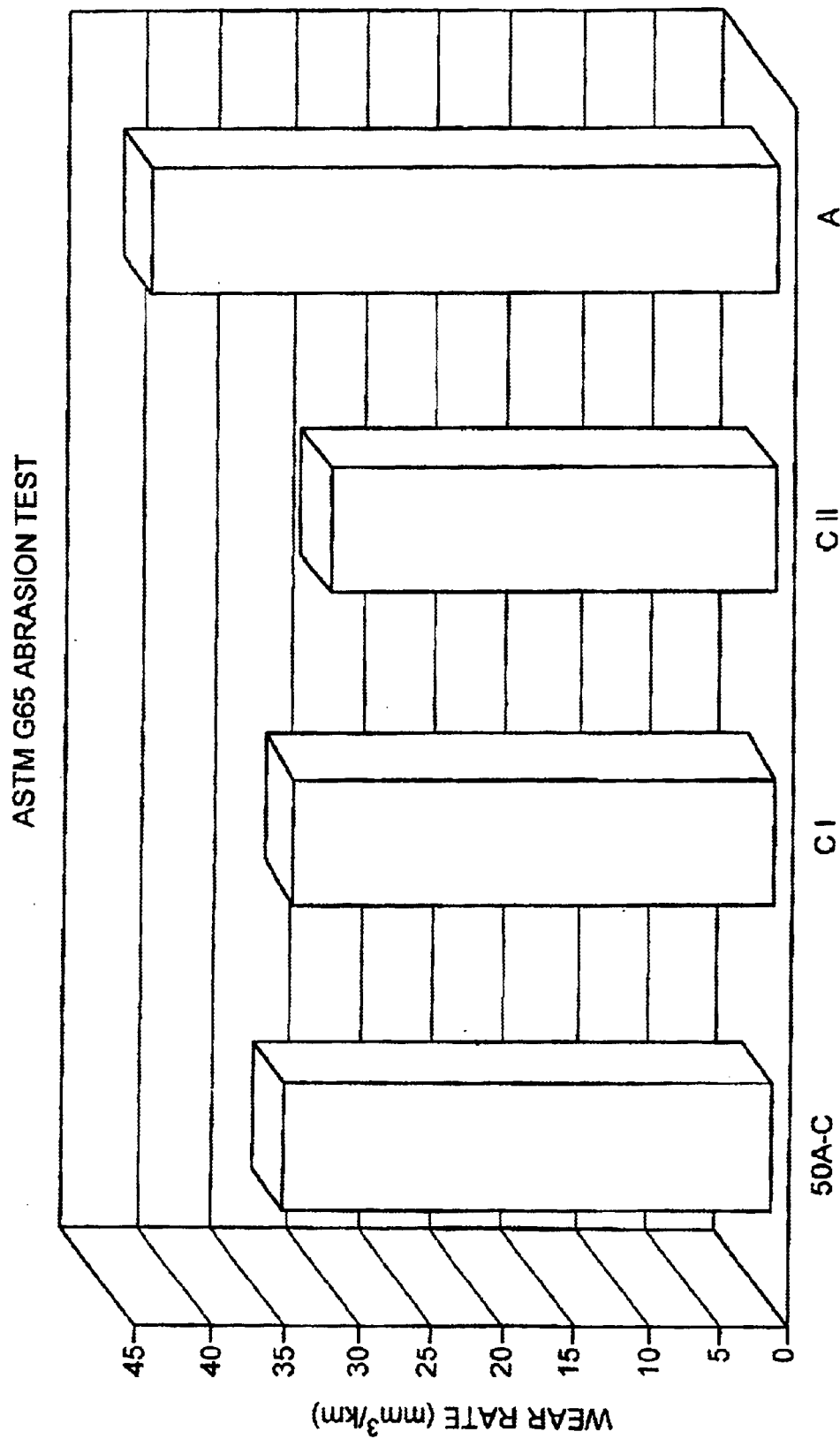

This application is a continuation-in-part of Ser. No. 10/118,133 filed Apr. 8, 2002, now abandoned.

BACKGROUND OF THE INVENTION

The present invention relates to chromia spray powders and to a process for making such powders. Such powders are useful in the production of thermally sprayed coatings on substrates.

It is well known that placing a spray coating of chromia on a substrate, which is usually a metal, confers a very significant improvement in the hardness and wear resistance of the surface. For this reason chromia coatings on embossing rolls or rotogravure rolls are often given a chomia coating s are used on many parts that are subjected to wear such as pump bodies, shafts, rolls and printing rolls. These parts can be used as sprayed or may go through subsequent finishing processing such as grinding, lapping or polishing. Printing rolls are usually further processed by laser engraving to make a pattern of cells that are useful for carrying ink. The coatings can be applied by a number of techniques but the most frequently used is based on the use of a thermal spray process in which the ceramic particles are injected into a plasma jet directed towards the substrate. The heat of the plasma jet melts the ceramic particles and causes them, upon impact with the substrate, to form a ceramic layer with a high degree of uniformity and integrity that is capable of protecting the substrate on which it is coated, giving the substrate the superficial hardness and wear characteristics of the ceramic with which it is coated.

There is however a problem because upon thermal spraying a chromia powder on to a substrate, some of the chromia reacts with oxygen and impurities in the chromia to yield very toxic hexavalent chromium compounds. The hexavalent chromium compounds are formed at elevated temperatures such as are used in thermal spraying ceramic powders and seem to be formed in the flame and especially in the outer parts of the flame. Material in this outer part is not heated to quite the same temperature and does not adhere to the surface sprayed to the same degree. The result is an undesirably high level of hexavalent chromia in the powder not adhered but remaining to be recycled or disposed of, thus presenting a significant environmental problem.

In an experiment to determine the extent of this effect the amount of hexavalent chrome in a thermal spray chromia powder was measured at 39 ppm and a coating of this powder thermally sprayed on to a substrate showed a concentration of 10 ppm. However when the overspray was sampled the amount of hexavalent chrome varied between 470 and 8800 ppm. Chromia ($Cr_2O_3$) converts to the hexavalent state in the presence of oxygen at temperatures over 1000° C. but reverts to chromia on cooling. However in the presence of alkali metal or alkaline earth metal impurities, or certain other impurities known in the art, the chromium forms complex compounds which stabilize the chromium in the hexavalent state.

There is therefore a urgent need for a new coating material that does not have the tendency of present chromia-based wear-resistant coating powders to oxidize to the hexavalent state when used in a thermal spray process and does not have the significant loss of hardness and wear resistance that characterize the conventional chromia coatings.

GENERAL DESCRIPTION OF THE INVENTION

Because alpha alumina and chromia (as used herein this term relates exclusively to the $Cr_2O_3$ state) have the same hexagonal crystal lattice structure with lattice parameters that are not too dissimilar, it is known that crystal structures incorporating both species are very stable. The oxides are said to be "soluble" in each other in the sense that each can occupy the same position in the hexagonal crystalline lattice of the other forming a solid solution. It is now found that alumina is very effective at inhibiting the formation of the hexavalent chromium species especially in the substantial absence of alkali metal and alkaline earth metal species that are found to promote the formation of this undesirable product. It is however also possible to inhibit the formation of the hexavalent chromium by the use of a chromia source that contains minimal amounts of stabilizers for hexavalent chromium.

The invention therefore comprises an essentially single-phase, thermosprayable powder comprising from 45 to 100% chromia and correspondingly up to 55% of alumina, all proportions being by weight, and less than 200 ppm, and preferably less than 50 ppm, of one or more stabilizers for hexavalent chromium.

It is further preferred that, where alumina is present, at least 90% of the alumina is in the alpha phase since this occasions fewer lattice inhomogeneities in the chromia/alumina crystal structure. Thus the term "essentially single-phase" when used herein to refer to the powder according to the invention allows for the presence of alumina in phases other than the alpha phase in an amount that is less than 10% of the alumina weight in the powder.

Alkali metals and alkaline earth metals are known to stabilize the hexavalent chromium compounds and, while these are often present in trace quantities in chromia, they are far more prevalent in alpha alumina made by conventional techniques. In conventional aluminas sodium tends to occur in larger quantities than the other alkali or alkaline earth metal oxides. In some cases it has proved advantageous to start the process with a precursor form of alpha alumina such as gamma alumina, kappa alumina, delta alumina, boehmite, alumina trihydrate and mixtures thereof either together or with alpha alumina itself. Such precursor forms can often be obtained in a state having very low amounts of impurities which lead to the formation of hexavalent chromium. Typically the amounts of these impurities in boehmite by comparison with a very pure alpha alumina are as follows: sodium oxide—27 ppm rather than 50 ppm; magnesia—22 ppm rather than 78 ppm; potassium oxide—less than 1 ppm rather than 68 ppm; and calcia less than 1 ppm rather than 104 ppm. It is clear therefore that the use of boehmite can confer significant benefits in terms of the reduction of these troublesome species stabilizing hexavalent chromium. The boehmite can then be fired along with the chromia powder to produce the single-phase crystalline chromia/alumina product. When using boehmite, which undergoes about 28% loss of weight upon firing, the amount added needs to be adjusted such that the proportions of alpha alumina and chromia in the finished product as in the desired range.

The essentially single-phase crystalline thermosprayable powder of the invention can be made by any suitable heat treatment technique such as for example by fusing the components by electric arc fusion, sintering powders of the components together, blending precursors in a sol-gel process and then drying and firing the gel, or by passing them through a plasma fusion process. However it is often preferred to produce the powder by sintering a mixture of the components in powder form at a temperature from 1250 to 1500° C. and preferably from 1300 to 1450° C. In general a firing cycle, (which includes conventional ramp up, dwell time at the firing temperature and ramp down times), of 10 to 40 hours and preferably 15 to 30 hours, is required. The cycle time for firing depends largely on the firing temperature, with lower firing temperatures generally requiring longer firing times to achieve the desired results. If the alumina feed is in the initial form of boehmite, temperatures at the high end of the range are often required to bring about complete conversion to the alpha form. This is essential because only the alpha form has the desired crystalline structure matching that of chromia. Leaving an excessive amount of transitional alumina, (that is, more than about 10% of the total alumina weight), results in the product not having an essentially single-phase crystalline structure. In addition if the particle size of the chromia is of the same order of magnitude as the alpha alumina or even greater, the readiness of the chromia to absorb into the alumina lattice is reduced and longer times at the firing temperature may be needed.

Firing a powder mixture is particularly effective when the particle size of the alpha alumina is greater than that of the chromia since the smaller chromia particles have a strong tendency to become absorbed into the alpha alumina crystal lattice to produce a single phase crystalline powder material. In such a process the alumina particles can have a $d_{50}$ that is from 5 to 20 times, and preferably from 2 to 15 times the $d_{50}$ of the chromia particles. This is however not essential and it is found when the particle sizes are proportioned in the opposite direction, that is with the chromia particles having the larger size range, the process is also effective. Control of the temperature of firing and the length of the firing time is an effective mechanism for controlling the size of the chromia/alumina crystals that are produced. Thus longer heating or higher temperatures are each effective to increase the crystal size from the sub-micron size by at least an order of magnitude.

When an alumina component mixed with the chromia is in the form of boehmite, the particle size is typically about the same as the chromia or even smaller but the agglomeration that occurs on firing to form the alpha alumina can often result in the favorable $d_{50}$ relationship described above.

DRAWINGS

FIG. 1 is a bar-graph showing the wear resistance of various samples of coatings.

DETAILED DESCRIPTION OF THE INVENTION

The invention is now described with reference to the following Examples which are intended to illustrate the principles of the invention and its application to the production of coated surfaces with good wear resistance properties.

A high purity alpha alumina made by a sol-gel process was analyzed for its impurity content and was found to contain the following: sodium oxide 50 ppm; magnesia 78 ppm; potassium oxide 68 ppm; and calcia 104 ppm. A powder of this alpha alumina with a particle size distribution such that the $d_{10}$ was 5.08 micrometers; the $d_{50}$ was 16.08 micrometers; and the $d_{90}$ was 29.2 micrometers was obtained. This powder was then mixed with fine chromia particles having the following particle size distribution: $d_{10}$ 0.94 micrometer; $d_{50}$ 1.77 micrometers; and $d_{90}$ 4.44 micrometers. All particle size measurements were obtained using a Microtrac measuring system.

These powders were then mixed in a 50:50 weight ratio and fired at a temperature of 1350° C. with a firing cycle of approximately 20 hours. At the end of that time the particle size distribution was as follows: $d_{10}$ 5.58 micrometers; $d_{50}$ 17.18 micrometers; and $d_{90}$ 34.75 micrometers.

When this powder was thermally sprayed on a substrate it was found to have a porosity of 5% which was the same as was obtained when the chromia powder was sprayed alone. The Vickers hardness was 1183 kg/mm$^2$ whereas that obtained with chromia alone was 1257 kg/mm$^2$.

In another sample of the powder according to the invention comprising alpha alumina and chromia in a weight ratio of 50:50 the powder had a 3 ppm content of hexavalent chromium and the overspray powder contained 5 ppm of the hexavalent chromium. The particle size distribution was as follows: $d_{10}$ 14.78 micrometers; $d_{50}$ 28.30 micrometers; and $d_{90}$ 48.98 micrometers.

The comparative wear resistance qualities of four thermally sprayed coatings were then compared. The powder according to the invention comprised a single-phase crystalline alpha alumina/chromia mixture in a 50/50 weight ratio, (50A-C). This was compared with two coatings obtained using pure chromia, (C1 and C2) and one using pure alpha alumina, (A). The test method set forth in the ASTM G65 abrasion test was used. The result appear in FIG. 1 and indicate that the 50A-C coating was more wear-resistant than the alumina and was only slightly worse than that obtained using chromia alone.

We claim:

1. An essentially single-phase, thermosprayable powder comprising from 45 to 100% chromia and correspondingly from 0 to 55% of alpha alumina, all proportions being by weight, and less than 200 ppm of each of any compound effective to stabilize chromium in the hexavalent state.

2. A powder according to claim 1 in which the stabilizing compound is selected from the group consisting of alkali metals and alkaline earth metals and the content of each is less than 50 ppm.

3. A powder according to claim 1 in which the proportion of alpha alumina is from 50 to 30% by weight.

4. A powder according to claim 1 in which the particles have a $d_{50}$ of from 5 to 200 micrometers.

5. A process for the production of a thermosprayable powder which comprises mixing an alumina powder having a content of alkali metal and alkaline earth metal oxide impurities of not more than 120 ppm of each, with a chromia powder also having less than 120 ppm of any impurity effective to stabilize chromium in the hexavalent state, the powders being mixed in proportions to give, upon firing, an essentially single phase crystalline powder comprising from 45 to 99% of chromia and from 55 to 1% of alpha alumina, all proportions being by weight, and firing the mixture at a temperature of from 1300 to 1500° C. to produce the said essentially single-phase crystalline powder.

6. A process according to claim 5 in which the alpha alumina particles have a $d_{50}$ particle size that is from 5 to 20 times the corresponding $d_{50}$ for the chromia powder.

7. A process according to claim 5 in which the alumina powder is selected from the group consisting of alpha alumina, gamma alumina, kappa alumina, delta alumina, boehmite, alumina trihydrate and mixtures thereof.

8. A process according to claim 7 in which the alumina powder mixed with the chromia powder is boehmite.

9. A process according to claim 5 in which the chromia and the alumina each have alkali metal and alkaline earth metal impurity levels that do not exceed 50 ppm of any such element.

* * * * *